3,073,671
PROCESS OF PREPARING DOUBLE FLUORIDE OF TETRAVALENT URANIUM AND ALKALINE EARTH METAL
Pierre Pagny and Petros Koussouros, Villeneuve-la-Garenne, France, assignors to Potasse et Engrais Chimiques, Paris, France, a corporation
No Drawing. Filed Dec. 8, 1958, Ser. No. 778,624
Claims priority, application France Jan. 2, 1958
8 Claims. (Cl. 23—14.5)

The present invention relates principally to a process for the preparation of double-fluorides of tetravalent uranium with an alkaline earth metal such as calcium or magnesium.

The method according to the invention uses at first double fluorides of tetravalent uranium and alkali metals corresponding with the general formula $UF_4$—$nMF$ where M is an alkali metal (such as sodium or potassium) or a radical (such as ammonium) and $n$ is an integral or fractional number which may vary from 1 to 4 according to the operating conditions.

The preferred method of obtaining such alkali double fluorides is that disclosed in the copending U.S. patent application filed November 7, 1957, under Serial Number 695,008.

The method disclosed in that copending application comprises the reaction of nascent hydrosulfurous acid on a mixture of a uranyl salt such as uranyl nitrate and the selected alkali cation in accordance with the equation:

$$UO_2(NO_3)_2 + HCO_2H + 2SO_2 + 5MF$$
$$\rightarrow UF_4 - MF + 2MNO_3 + 2HMSO_3 + CO_2$$

If the quantity of alkali fluoride added exceeds the indicated stoichiometric proportion, the double fluoride $UF_4$—$nMF$ is obtained, where $n$ can assume any value from 1 to 4.

Obviously, the present invention is not restricted to the use of alkali double fluorides obtained by the method above specified; that method however is preferred since it provides salts of excellent crystal structure that can be readily separated out by filtering with the high purity that is desirable.

If it was attempted to effect the above mentioned reaction with an alkaline earth fluoride $M'F_2$ (wherein M' is Ca or Mg for example), then it would not be found possible to obtain the alkaline earth and uranium double fluoride. In fact, on the one hand, the fluoride $M'F_2$ is insoluble in the reaction medium and, on the other hand, even assuming the reaction able to proceed, calcium and magnesium sulfite formed would precipitate simultaneously with the desired double fluoride, rendering very difficult the extraction of this latter body.

According to the invention the method of preparing double fluorides of tetravalent uranium and an alkaline earth metal is chiefly characterized in that a solution of an alkaline earth salt is reacted with a double fluoride of tetravalent uranium and of an alkali metal, this double decomposition reaction yielding the desired double fluoride under crystallized state.

The above is based on the surprising experimental fact that if an alkaline earth salt solution is reacted with uranium and alkali metal double fluoride which is an insoluble crystallized salt, a reaction of double decomposition ensues, this reaction being practically total.

The general equation of the reaction is as follows:

$$UF_4 - nMF + 0.5nM'^{++} \rightarrow UF_4 - 0.5nM'F_2 + nM^+ \quad (I)$$

In which $n$ is an integral or fractional number from 1 to 4, M is a monovalent alkali metal or radical (such as $NH_4$, K, Na) and M' a divalent alkaline earth metal (for instance Ca or Mg).

The double fluoride $UF_4$—$0.5nM'F_2$ is obtained as a highly insoluble, crystallized precipitate.

The Reaction I is given in ionic form. This is because it is necessary for the reagent yielding the alkaline earth metal to be ionized.

As substances susceptible of being used in this way, it is to be mentioned calcium chloride, calcium nitrate, magnesium nitrate, magnesium chloride and magnesium sulfate.

Preferably, the alkaline earth salt used for the reaction is such that its ions, when reacted with the alkali cations of the double fluoride used, will yield an alkali salt having a high value for the physical quantity called solubility product.

The following equations are examples of reactions that appear to be industrially advantageous:

$$UF_4 - NH_4F + 0.5CaCl_2 \rightarrow UF_4 - 0.5CaF_2 + NH_4Cl$$
$$UF_4 - 1.5KF + 0.75Ca(NO_3)_2$$
$$\rightarrow UF_4 - 0.75CaF_2 + 1.5KNO_3$$
$$UF_4 - 2NaF + MgSO_4 \rightarrow UF_4 - MgF_2 + Na_2SO_4$$

Preferably, the reactions are performed at temperatures of about 100° C. in order to obtain a satisfactory reaction speed.

The reaction is a practically complete one and the resulting alkali salt solution contains only a small amount of uranium in solution.

Uranium may be recovered by treatment with ammonia in a medium of the pH of which is about 6, or by any other conventional means.

*Numerical Example No. 1*

In one liter of distilled water 50 grams of dehydrated calcium chloride $CaCl_2.2H_2O$ are dissolved. The resulting solution is heated to 90° C. and 100 grams of double fluoride of uranium and ammonium $UF_4$—$NH_4F$ containing 67.8% uranium are added with agitation.

The suspension is maintained at a temperature of 90° C. and is stirred for about two hours, then filtered.

The precipitate is washed on the filter and is dried at a temperature of 120° C. The weight of dry precipitate thus obtained is 101.5 grams.

The uranium content of the precipitate is 64.5%. It is free of hexavalent uranium and its content in ammonium ions ($NH_4^+$) is 0.1% only. The conversion output is substantially 98%.

The filtrate is acid (pH of about 1.5). It contains only about 0.8 g. liter of uranium as chloride, a small part of which is in hexavalent form.

These residual uranium salts may be precipitated with an ammoniacal liquor in order to recover the uranium therein.

*Numerical Example No. 2*

To one liter of a solution of calcium nitrate containing 75 grams of tetrahydrated calcium nitrate there is added 100 grams of double fluoride of tetravalent uranium and of sodium, corresponding substantially to the formula $UM_4$—$1.5NaF$ and containing 63 percent of uranium.

The suspension is stirred and heated up to 90° C. during two hours, then it is filtered. The precipitate is washed on the filter then dried at 110° C. The weight of the dry precipitate which is thus obtained is 95.5 grams. The content in uranium is 65.5 percent and the content in sodium is 0.2 percent.

*Numerical Example No. 3*

85 grams of heptahydrated magnesium sulphate are dissolved in a liter of water and there is added to the solution 100 grams of double fluoride of tetravalent uranium and of ammonium, corresponding to the formula $UF_4$—$NH_4F$.

The suspension is heated and maintained in stirred condition at 90° C. during two hours then it is filtered.

The precipitate is washed on filter with distillated water then dried at 120° C. The weight of the dry precipitate obtained is 106 grams. The content in uranium is 63 percent. It contains only traces of hexavalent uranium and its content in ammonium ions is 0.3 percent.

The filtrate contains 0.5 gram of uranium per liter.

*Numerical Example No. 4*

To a liter of a solution of magnesium nitrate containing 88 grams of $Mg(NO_3)_2 6H_2O$ there is added 100 grams of double fluoride of uranium$^{IV}$ and ammonium, the composition of which substantially corresponds to the formula $UF_4$—$NH_4F$.

The suspension is heated and stirred at a temperature of 95° C. during two hours then it is filtered.

The precipitate is washed on the filter with distillated water, then dried at 120° C. The weight of the dry precipitate obtained equals 104 grams. The content in uranium is 64.2 percent and the content in ammonium ions is 0.35 percent.

The filtrate contains 0.6 gram of uranium per liter.

*Numerical Example No. 5*

45 grams of pure dehydrated calcium chloride are dissolved in a liter of distilled water and to the solution thus obtained there is added 100 grams of double fluoride of uranium$^{IV}$ and sodium, the composition of which substantially corresponds to formula $Na_2UM_6$ and contains 60 percent of uranium.

The suspension is heated up to 90° C., then stirred at this temperature during two hours. The suspension is filtered, then the precipitate obtained is washed on filter with distillated water. After drying in air at 110° C., the weight of the precipitate obtained is 116 grams, its content in uranium is 50.8 percent and its content in sodium is 0.3 percent.

There are only traces of uranium$^{VI}$.

The content of the filtrate in uranium is 0.75 gram per liter.

*Numerical Example No. 6*

In a liter of distillated water 70 grams of hexahydrated magnesium chloride $MgCl_2 \cdot 6H_2O$ are dissolved. The solution is heated up to 90° C. and while the solution is stirred there is added 100 grams of double fluoride of uranium$^{IV}$ and ammonium $UF_4$—$NH_4F$.

The suspension is maintained at 90° C. stirred during three hours, then filtered.

The precipitate is washed on filter and dried at 120° C. The weight of the precipitate obtained is 103 grams. The content in uranium$^{IV}$ is 65.2 percent and the content in uranium$^{VI}$ is 0.1 percent. The content in ammonium ions is 0.15 percent.

The filtrate contains 0.5 gram of uranium per liter.

The present invention further comprises the application of the double fluoride $UF_4$—$0.5nM'F_2$ to the manufacture of metallic uranium, by means of a well-known reaction, but which could not heretofore be performed industrially because there was no available method known for producing sufficient amounts of the above specified double fluoride which has the advantage of greater stability relative to the fluoride $UF_4$.

Said process comprises thermically reacting with the double fluoride $UF_4$—$0.5nM'F_2$ the alkaline earth metal M' in a divided state and intimately mixed with said double fluoride, previously dried.

There is thus produced by calcio-thermics the following reaction:

and by magnesio-thermics:

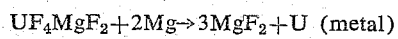

What we claim is:

1. A process for preparing a double fluoride of tetravalent uranium and of an alkaline earth metal selected from the group consisting of calcium and magnesium, said process comprising mixing a solution of an alkaline earth salt selected from the group consisting of chlorides, nitrates and sulphates of said alkaline earth metal which are soluble in water with a double fluoride of tetravalent uranium and of an alkali cation selected from the group consisting of sodium, potassium and ammonium radical, heating said solution to a temperature of 90–100° C., subsequently stirring said heated solution whereby a double fluoride of tetravalent uranium and of said alkaline earth metal is precipitated in a crystallized state through a double decomposition reaction, and recovering said double fluoride of tetravalent uranium and alkaline earth metal.

2. A process according to claim 1 wherein said alkaline earth salt is calcium chloride.

3. A process according to claim 1 wherein said alkaline earth salt is calcium nitrate.

4. A process according to claim 1 wherein said alkaline earth salt is magnesium nitrate.

5. A process according to claim 1 wherein said alkaline earth salt is magnesium chloride.

6. A process according to claim 1 wherein said alkaline earth salt is magnesium sulphate.

7. A process for preparing a double fluoride of tetravalent uranium and of an alkaline earth metal selected from the group consisting of calcium and magnesium, said process comprising mixing a solution of an alkaline earth salt selected from the group consisting of calcium chloride, calcium nitrate, magnesium nitrate, magnesium chloride and magnesium sulphate with a double fluoride of tetravalent uranium and of an alkali cation selected from the group consisting of sodium, potassium and ammonium radical, heating said solution to a temperature of 90–100° C., subsequently stirring said heated solution while keeping the temperature thereof at 90–100° C. whereby a double fluoride of tetravalent uranium and of said alkaline earth metal is precipitated in a crystallized state through a double decomposition reaction, and recovering said double fluoride of tetravalent uranium and alkaline earth metal.

8. A process for preparing a double fluoride of tetravalent uranium and of an alkaline earth metal selected from the group consisting of calcium and magnesium, said process comprising mixing a solution of an alkaline earth salt selected from the group consisting of calcium chloride, calcium nitrate, magnesium nitrate, magnesium chloride and magnesium sulphate with a double fluoride of tetravalent uranium and of an alkali cation selected from the group consisting of sodium, potassium and ammonium radical, heating said solution to a temperature of 90–100° C., stirring said heated solution whereby a double fluoride of tetravalent uranium and said alkaline earth metal is precipitated in a crystallized state through a double decomposition reaction, separating said double fluoride of tetravalent uranium and alkaline earth metal from the solution by filtering, and subsequently washing said double fluoride of tetravalent uranium and alkaline earth metal.

(References on following page)

References Cited in the file of this patent

UNITED STATES PATENTS

| | | |
|---|---|---|
| 1,826,806 | Marden et al. | Oct. 13, 1931 |
| 2,650,153 | Ellis et al. | Aug. 25, 1953 |
| 2,756,125 | Abelson | July 24, 1956 |
| 2,768,059 | Bailes | Oct. 23, 1956 |
| 2,834,672 | Foster | May 13, 1958 |
| 2,868,636 | Prescott et al. | Jan. 13, 1959 |
| 2,873,165 | Bailes et al. | Feb. 10, 1959 |
| 2,874,026 | Wheelwright | Feb. 17, 1959 |
| 2,880,059 | Tolley | Mar. 31, 1959 |

OTHER REFERENCES

Katz et al.: "Chemistry of Uranium," page 382 (1951), McGraw-Hill Book Co., New York.

Nuclear Science Abstracts, vol. 14, No. 7302 (April 30, 1960), which refers to AEC Document HW–35815 by Tolley, March 17, 1955, declassified January 12, 1960, page 14.

AEC Document HW–39087 by Tolley, September 19, 1955, pp. 3–6, 9, 13.

Proceedings of the Second United Nations International Conference on the Peaceful Uses of Atomic Energy, September 1–13, 1958, vol. 4, pages 69–72, United Nations, New York.